United States Patent
Nguyen

(10) Patent No.: US 6,626,241 B2
(45) Date of Patent: Sep. 30, 2003

(54) METHOD OF FRAC PACKING THROUGH EXISTING GRAVEL PACKED SCREENS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 102 days.

(21) Appl. No.: 10/011,025

(22) Filed: Dec. 6, 2001

(65) Prior Publication Data

US 2003/0106689 A1 Jun. 12, 2003

(51) Int. Cl.[7] .......................... E21B 43/04; E21B 43/08
(52) U.S. Cl. .......................... 166/278; 166/308; 166/51
(58) Field of Search ................................ 166/278, 280, 166/281, 51, 308

(56) References Cited

U.S. PATENT DOCUMENTS

| | | |
|---|---|---|
| 5,330,005 A | 7/1994 | Card et al. |
| 5,439,055 A | 8/1995 | Card et al. |
| 5,492,178 A | 2/1996 | Nguyen et al. |
| 5,501,274 A | 3/1996 | Nguyen et al. |
| 5,501,275 A | 3/1996 | Card et al. |
| 5,532,249 A | 7/1996 | Wilkerson et al. |
| 5,551,514 A | 9/1996 | Nelson et al. |
| 5,582,279 A | 12/1996 | Buchanan et al. |
| 5,602,083 A | 2/1997 | Gabrysch et al. |
| 5,755,286 A | 5/1998 | Ebinger |
| 5,775,425 A | 7/1998 | Weaver et al. |
| 5,783,527 A | 7/1998 | Dobson, Jr. et al. |
| 5,888,944 A | 3/1999 | Patel |
| 5,909,774 A | 6/1999 | Griffith et al. |
| 5,934,376 A | 8/1999 | Nguyen et al. |
| 5,947,200 A | 9/1999 | Montgomery |
| 6,216,785 B1 | 4/2001 | Achee et al. |
| 6,253,851 B1 | 7/2001 | Schroeder et al. |

OTHER PUBLICATIONS

Economides, et al. papers entitled "Petroleum Well Construction", pp 8–10 and 405–409 (undated).

*Primary Examiner*—David Bagnell
*Assistant Examiner*—G M Collins
(74) *Attorney, Agent, or Firm*—Robert A. Kent; John F. Booth

(57) ABSTRACT

Disclosed are improved methods and apparatus for improving the production of hydrocarbons from wells having gravel pack in a production zone. The methods and apparatus basically comprise the steps of entering a gravel packed well and perforating the gravel pack screen and fracture packing the formation through the screen perforations. At least the last portion of the particulate is preferably coated with a consolidator that will form a proppant pack. Installing a second screen in the well to overlap the perforations in the gravel pack screen to prevent the particulate from reentering the well.

90 Claims, 12 Drawing Sheets

METHOD OF FRAC PACKING THROUGH EXISTING GRAVEL PACKED SCREENS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

TECHNICAL FIELD

The present inventions relate to improvements methods and apparatus used in the production of hydrocarbons from subterranean wells completed with gravel packing. More particularly the present inventions relate to improvements in completing new and reworking existing gravel packed wells wherein fracturing is conducted with the gravel pack installed in the wellbore.

BACKGROUND OF THE INVENTION

As a result of drilling and completion practices, the formation permeability near the wellbore can be reduced. Drilling fluid invasion of the formation, dispersion of clay, presence of mudcake, and cement tend to reduce the formation permeability around the wellbore. Perforation, hydraulic fracturing and other completion practices tend to increase the effective permeability around the wellbore. The zone of reduced formation permeability is called a "skin" and the resulting effect on well performance is called the "skin factor." "Skin Factor" is described and defined in PETROLEUM WELL CONSTRUCTION, by Economides, et al 1998, pp 8–10 and 405–409 incorporated herein by reference. The "skin factor" can be used to indicate the well performance. The factor is positive for a damaged well and negative for a stimulated well. The factor indicates how the area around the well compares to the original reservoir permeability.

Oil and gas wells are often completed in unconsolidated formations containing loose and incompetent fines and sand, which migrate with fluids produced by the wells. The presence of formation fines and sand in the produced fluids is disadvantageous and undesirable in that the particles abrade pumping and other producing equipment, raise the wells skin factor and reduce the fluid production capabilities of the producing zones in the wells. It is common to install gravel packs of particulate material in the well to serve as filters to keep fines and formation sand from flowing back with produced fluids into the wellbore. The size of the sand in the gravel pack is selected such that it prevents formation fines and sand from flowing into the wellbore with produced fluids.

Subterranean zones or formations have been stimulated by creating fractures in the zones and depositing particulate material commonly called proppant in the fractures to maintain them in open positions. In cased wells fracturing is conducted after perforation of the casing and formation. In some formations the fracturing process can itself create fines in the fractured formation. Typically gravel packing occurs after perforation and fracturing. However, fractures and perforations open flow paths into the formation that create problems in process and equipment used for forming gravel packs.

Downhole particulate control apparatus have been used in gravel packed wells to restrict or prevent the return of particulate into the wellbore. Sand screens, liners and the like have commonly been installed in the wellbores penetrating unconsolidated zones. In a typical gravel pack completion, a screen is placed in the wellbore inside the gravel pack. The term "screen" is used in its broadest functional sense meant to mean structures that screen out the particulate and includes porous structures that pass well fluids but prevent or block the passage of particulate. Screens include not only the classic wire woven varieties but also other structures including porous solids, slotted, perforated or silted liners and the like. The screen is sized to prevent the particulate in the slurry from flowing therethrough. The screen is typically connected to a tool that includes a production packer and a cross-over tool. The cross-over tool is in turn connected to a work or production string.

Particulate material which is usually graded sand, often, referred to in the art as gravel, is pumped in liquid slurry down the work or production string and through the cross over whereby it flows into the annulus between the screen and the wellbore. The particulate is deposited in the annulus around the screen whereby it forms a gravel pack. In cased well the wellbore is defined by the inside of the casing, in open hole completions the wellbore is defined by the inside of drilled hole. In forming the gravel packs the liquid leaks off into the formation and into the screen leaving the gravel in place. In a conventional well where fracturing (and possibility perforation) have preceded gravel packing procedures, liquid forming the slurry can leak off uncontrollably into the subterranean zone causing defects in the gravel pack. In cased wells the leak off is through the perforations in the casing. In open hole wells the leak off is through cracks, holes, and fractures in the formation sealing mud cake. Liquid leak off through the screen can be controlled with flow pipes and the like but uncontrolled liquid leak off into the formation remains a problem.

Problems encountered in forming gravel packs or in placing proppant in the fractures can raise the skin factor and negatively effect well production. These problems and procedures associated with gravel packing are described in U.S. Pat. No. 5,934,376 (the entire disclosure of which is incorporated by reference). For example, a problem often encountered in forming gravel packs, particularly gravel packs in long and/or deviated unconsolidated producing intervals, is the formation of sand bridges in the annulus. That is, non-uniform sand packing of the annulus between the screen and the wellbore often occurs as a result of the loss of carrier liquid from the particulate slurry into high permeability portions of the subterranean zone which in turn causes the formation of sand bridges in the annulus before all the particulate has been placed. Frac packing and perforation are designed to create zones of high permeability, which in turn have the disadvantage of contributing to the formation of sand bridges. The sand bridges block further flow of the slurry through the annulus, which leaves voids in the annulus. When the well is placed on production, the flow of produced fluids is concentrated through the voids in the gravel pack, which soon cause the screen to be eroded resulting in the migration of fines and sand with the produced fluids to result.

In addition, mechanical chokes or pinching can form when the fractures close at the voids as proppant is over displaced away from the wellbore during the flush stage. In many cases many of these existing well production inhibiting problems are not recognized until after the well is completed and in service. Reworking the well to eliminate these problems is uneconomic because of the cost of removing the existing down hole particulate control apparatus. In addition, some previously properly gravel or frac packed wells could have improved production by performing formation perforation followed by fracturing. However, the installed down hole particulate control apparatus cannot be economically removed.

Thus, there are needs for improved methods and apparatus for economically completing and reworking gravel packed wells to stimulate the producing interval in subterranean zones with existing particulate control apparatus in place.

SUMMARY OF THE INVENTIONS

The present inventions contemplate an improved method and apparatus for completing and reworking wells by fracturing and perforation with existing gravel packs and downhole production equipment in place. This allows the well to be completed or reworked to stimulate and in turn improve production without incurring the expense removing the existing gravel packs and screen. In addition, gravel packing in new wells can be completed prior to perforation and frac packing, thereby reducing problems in gravel packing associated with leak off into the formation.

The present inventions contemplate perforating and frac packing wells after gravel packing. The present inventions are applicable to reworking existing wells and completing new wells. By gravel packing before perforating and fracturing, fluid leak off into the formation through the perforations during gravel packing is prevented. The quality of the gravel pack can be controlled and improved. In existing wells additional perforations and fracture pack procedures can be performed to rework the wells.

In another aspect of the present inventions perforation and frac packing is performed through the in place screen. A consolidating particulate is used in at least the final portion of the frac packing process and is allowed to accumulate and consolidate in and adjacent the wellbore. Thereafter, the particulate in the wellbore is removed while the consolidated particulate adjacent the wellbore prevents flow back of particulate. Thereafter, a particulate control apparatus such as a radially expandable screen can be installed inside the in place screen.

The novel features of the inventions are set forth with particularity in the claims. The invention will best be understood from the following description when read in conjunction with the accompanying drawings.

BRIEF DESCRIPTION OF THE DRAWINGS

The accompanying drawings are incorporated into and form a part of the specification to illustrate several examples of the present inventions. These drawings together with the description serve to explain the principals of the inventions. The drawings are only for the purpose of illustrating preferred and alternative examples of how the inventions can be made and used and are not to be construed as limiting the inventions to only the illustrated and described examples. The various advantages and features of the present inventions will be apparent from a consideration of the drawings in which.

DETAILED DESCRIPTION OF THE INVENTIONS

Figure 1:
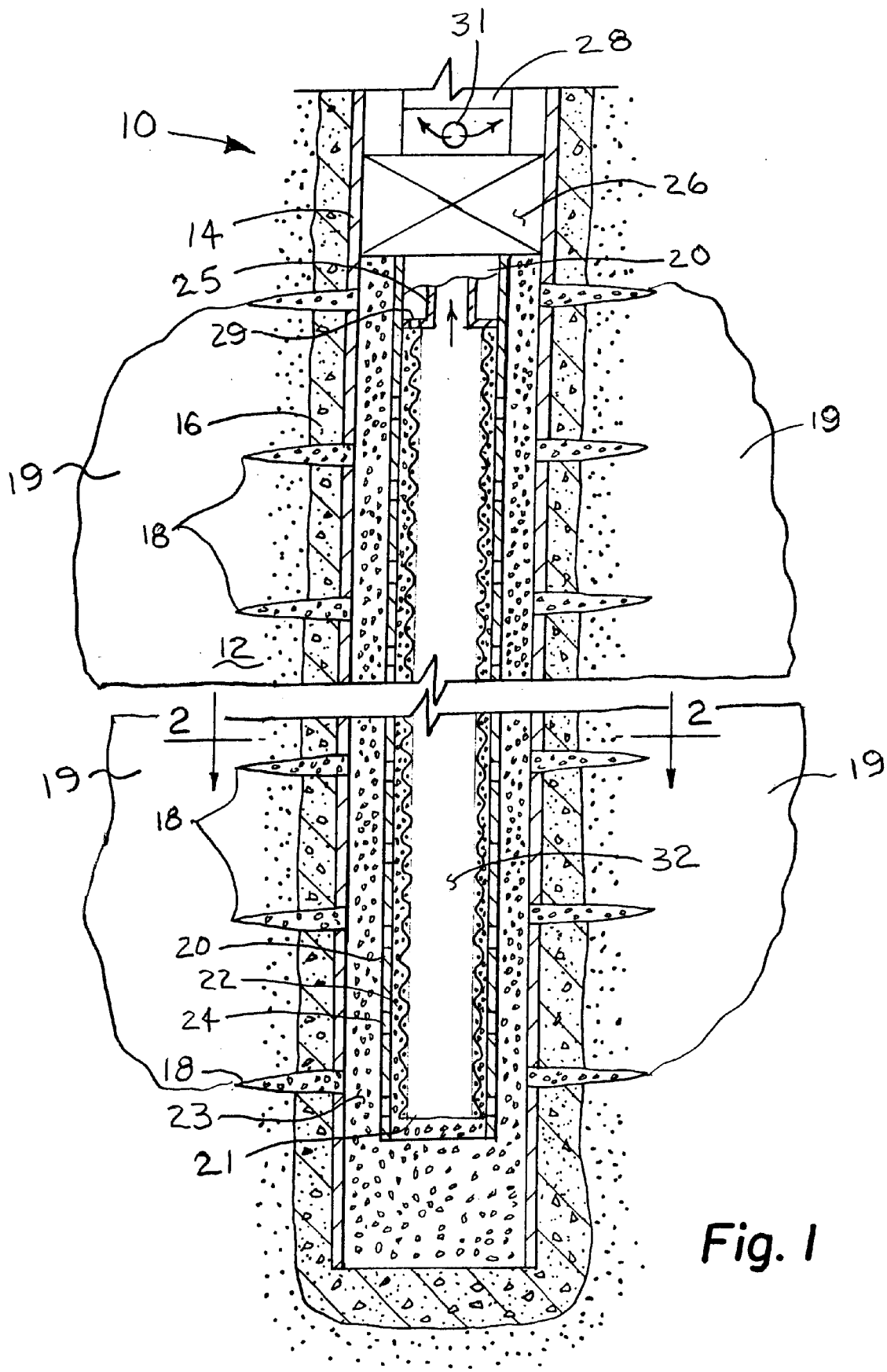
FIG. 1 is a longitudinal cross sectional view of a conventional gravel packed wellbore penetrating a subterranean producing zone and having a casing cemented therein with a particulate control apparatus therein in the form of a slotted liner with a first internal sand screen.

The present inventions are described by reference to drawings showing one or more examples of how the inventions can be made and used. In these drawings, reference characters are used throughout the several views to indicate like or corresponding parts.

In FIG. 1, an existing hydrocarbon well 10 requiring service is shown intersecting an unconsolidated formation or subterranean zone 12. The well 10 is completed using gravel packing and a particulate control apparatus. In this embodiment both a screen and slotted liner are shown installed in the well to prevent particulate from flowing into the well with the produced hydrocarbons. It should be appreciated that the present inventions are applicable to wells having various types of particulate control apparatus including screens, slotted liners, combinations of screens and liners or other apparatus. The present inventions can be performed in either new or existing vertical or horizontal wellbores with either open-holes or cased cement bores. The term "vertical wellbore" is used to mean the portion of a wellbore which is substantially vertical or somewhat deviated from vertical. The term "horizontal wellbore" is used herein to mean the portion of a wellbore that is highly deviated or extends horizontally.

Figure 2:
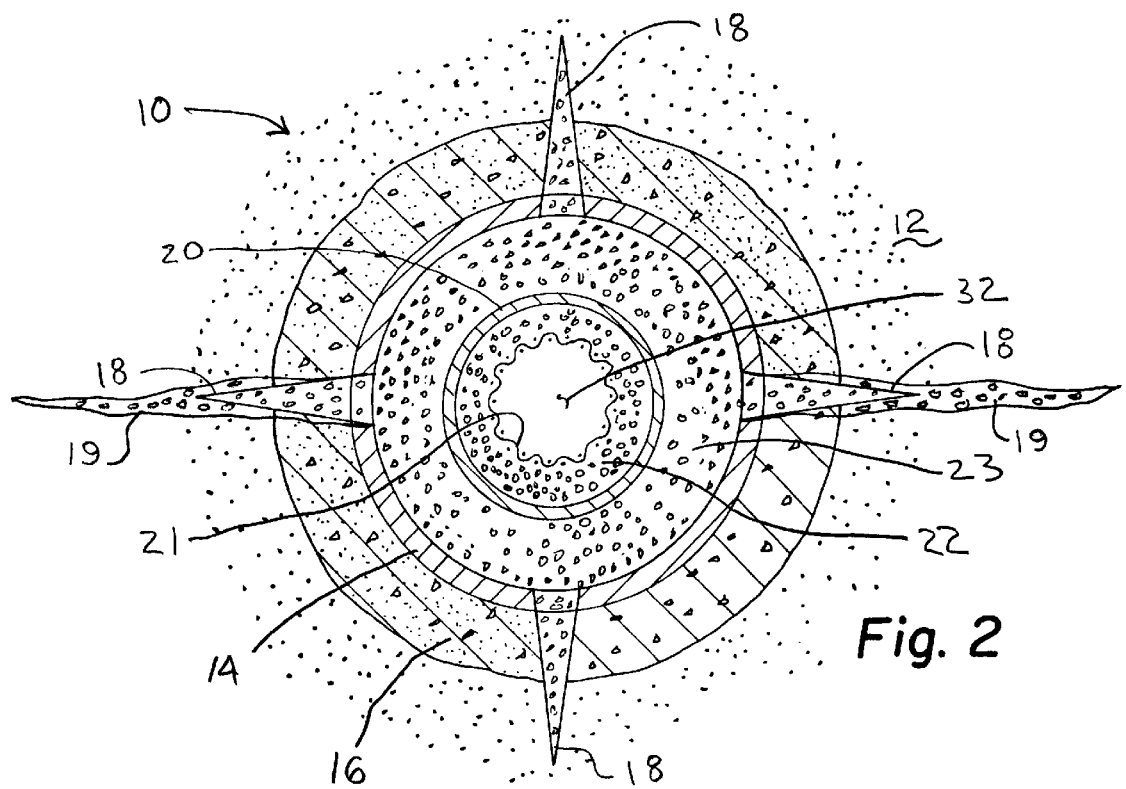
FIG. 2 is a cross-sectional view of the wellbore taken on line 2—2 of FIG. 1 looking in the direction of the arrows illustrating some of the existing perforations and fractures.

Referring now to the drawings and particularly to FIGS. 1 & 2, there is illustrated an existing vertical wellbore 10 having perforated casing 14 extending into an unconsolidated subterranean zone 12. The casing 14 is bonded within the wellbore 10 by a cement sheath 16. A plurality of spaced perforations 18 are produced in the wellbore 10 utilizing conventional perforating apparatus and extend through the casing 14, cement sheath 16 and into the unconsolidated producing zone 12. There after fractures 19 extending into the zone are formed by subjecting the zone to a liquid slurry under pressure and the fractures are filled with particulate in a process called frac packing. In some open hole wells frac packing is performed without perforation. Conventionally in both cased and open hole wells perforation and frac packing procedures are performed before gravel packing is installed.

A slotted liner 20 having an internal sand screen 21 installed therein forms an annulus 22 between the sand screen 21 and the slotted liner 20. As previously pointed out wells are completed with either or both liners and screens. The slotted liner 20 and sand screen 21 have lengths such that they substantially span the length of the producing interval of the zone intersected by the wellbore 10. Slotted liner 20 is of a diameter such that when it is disposed within the wellbore 10 an annulus 23 is formed between it and the casing 14. Slots 24 in the slotted liner 20 can be circular, elongated, rectangular or other shapes. As is explained in U.S. Pat. No. 5,934,376, the combination of liner and screen are used to produce uniform gravel packing.

As shown in FIGS. 1 & 2, the slotted liner 20 and sand screen 21 are connected to a cross-over 25 which is in turn connected to a production string 28. A production packer 26 is attached to the cross-over 25. The cross-over 25 and production packer 26 are conventional gravel packing tools well known to those skilled in the art. The cross-over 25 is a sub-assembly which allows fluids to follow a first flow pattern whereby particulate material suspended in a slurry can be packed in the annuli between the sand screen 21 and the slotted liner 20 and/or between the slotted liner 20 and the wellbore 10. In open hole completions (without casings) the particulate is packed in the open hole around the screen. That is, the particulate material suspension flows from inside the production string 28 to the wellbore around the casing (or around the screen in open hole completions). The suspension flows by way of two or more ports 29 in the cross-over 25. Simultaneously, fluid is allowed to flow from inside the sand screen 21 upwardly through the cross-over 25 to the other side of the packer 26 outside of the production string 28 by way of one or more ports 31 in the cross-over 25. By pipe movement or other procedure, flow through the cross-over 25 can be selectively changed to a second flow pattern (not shown) whereby fluid from inside the sand screen 21 flows directly into the production string 28 and the ports 31 are shut off. The production packer 26 is set by pipe movement or other procedure whereby the annulus 23 is sealed.

The carrier liquid in the slurry leaks off through the perforations 18 into the unconsolidated zone 12 and through the screen 21 to the screen interior 32 from where it flows through cross-over 25 and into the casing 14 above the packer 26 by way of the ports 31. It is during this procedure that uncontrolled fluid leak off into the formation can create problems during the gravel packing. The previously formed perforations and or packed fractures form high porosity liquid flow paths that can cause sand bridging and other problems in the gravel packing procedures. These problems are present in the gravel packing of both cased and open hole completed wells.

After the particulate material has been packed into the wellbore 10 as described above, the well is placed in production. The pack of particulate material filters out and prevents the migration of formation fines and sand with fluids produced into the wellbore from the unconsolidated subterranean zone 12.

As previously described, some completed gravel packed wells, such as illustrated in FIGS. 1 & 2 are marginal after producing for a period of time in that they have high skin factors resulting from deteriorating well conditions and from improper or less than optimum completion practices. In these, wells expensive remedial procedures are uneconomic. For example, for completed well 10 to have zone 12 reworked, the packer and 26 screen/liner must be removed to the surface. In older wells the possibility of loosing the entire well through casing collapse is present even if side cutting does not occur. Even if successful, the cost associated with removing the existing downhole particulate control apparatus and associated packers and tools are prohibitive, in many cases. As will be described in reference to FIGS. 3–7 the process and improved apparatus of the present invention eliminates these costs and makes reworking marginal wells with existing gravel packs economic.

According to the present invention the portion of the well penetrating the zone 12 to be reworked is first isolated from the remainder of the well by bridge plugs, packers or the like. In the illustrated embodiment well 10, requiring rework intersects a single hydrocarbon bearing zone 12. In a multiple zone well each zone could be isolated and separately treated.

Figure 3:
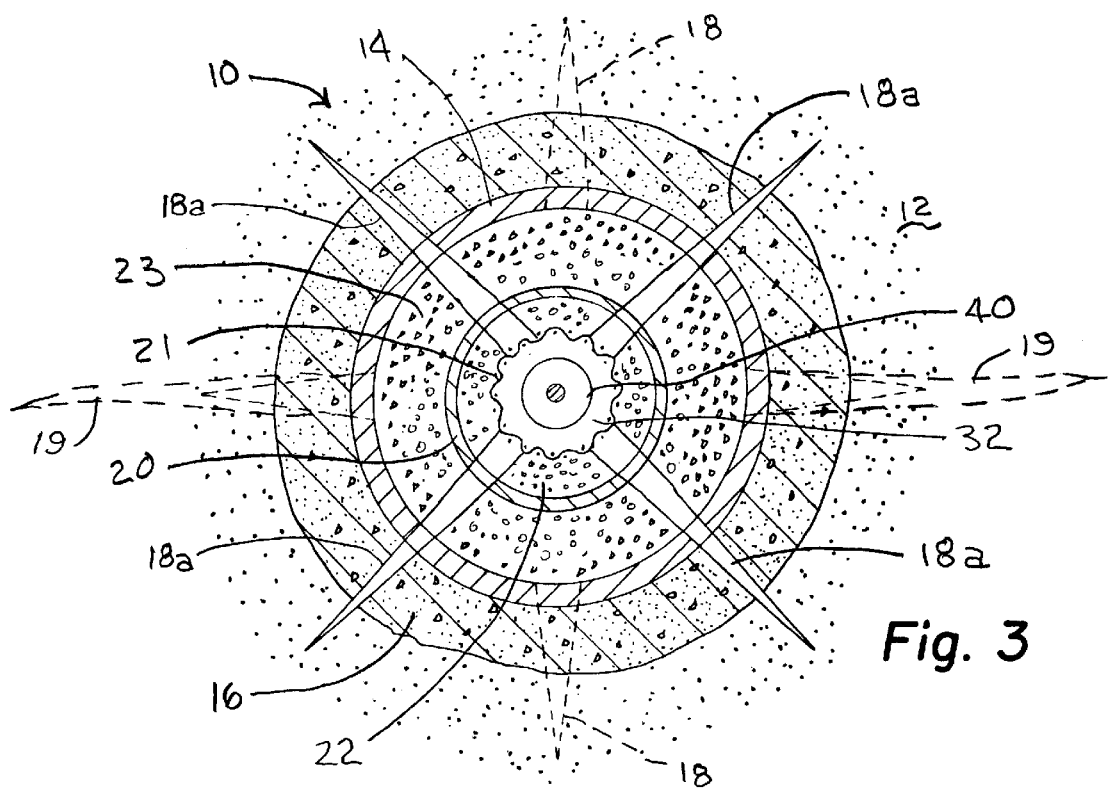
FIG. 3 is a cross-sectional view of the wellbore similar to FIG. 2 illustrating the step of placing a perforating apparatus in the wellbore and forming perforations extending from within the existing particulate control apparatus and into the surrounding formation.
Figure 4:
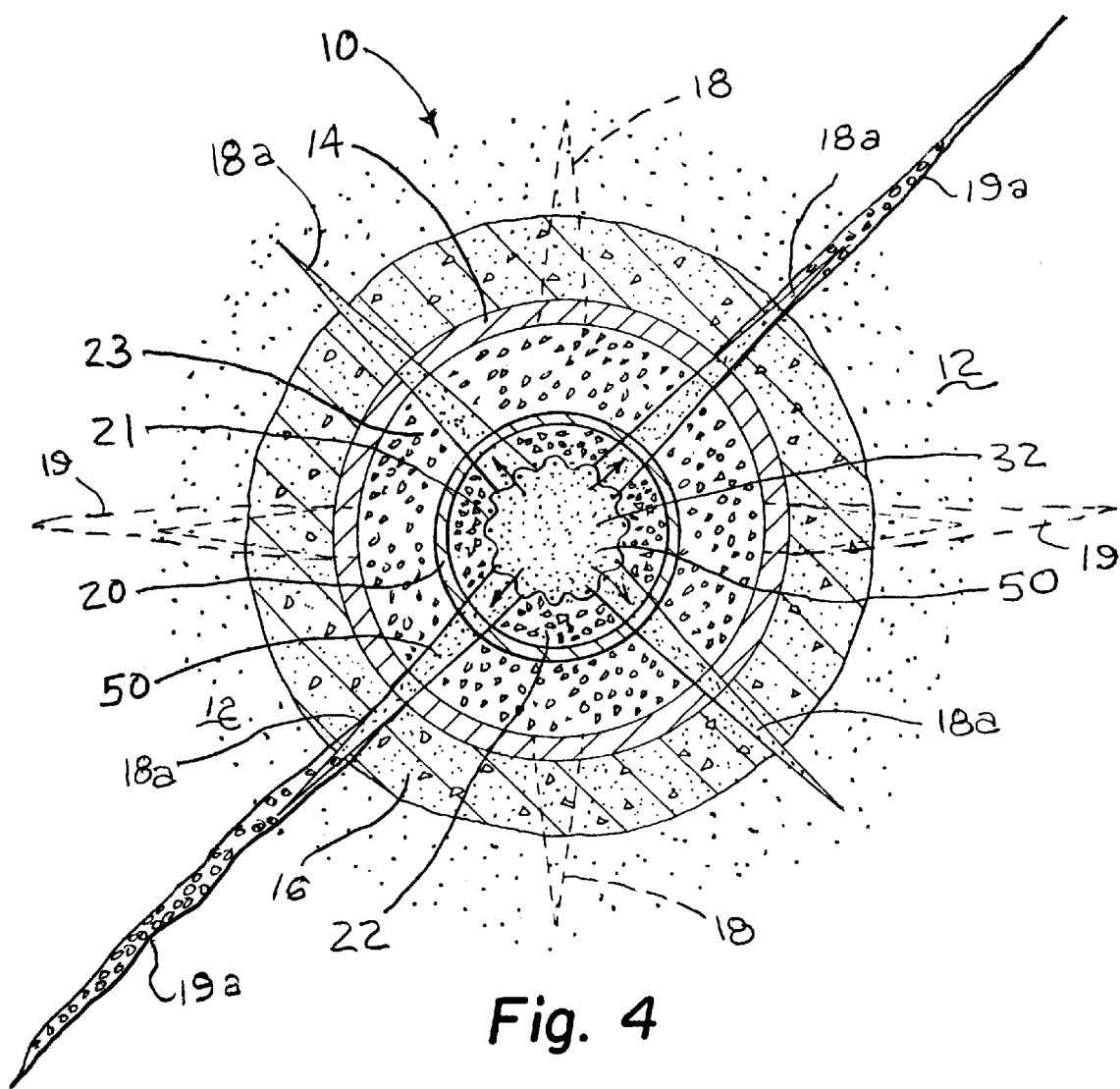
FIG. 4 is a cross-sectional view of the wellbore similar to FIG. 2 illustrating the step of creating fractures and inserting particulate material in the wellbore, perforations and formation fractures.

With the zone 12 isolated a perforating apparatus 40 is positioned in the wellbore 10 in the interior 32 of the screen 21 (see FIG. 3). In the illustrated embodiment is a perforating gun assembly with a plurality of shaped charges. It should be appreciated that other forms of perforating apparatus could be used such as mechanical and hydraulic perforators. When ignited the charges form perforations 18a extending from the interior 32 through the screen 21, liner 20, casing 14 and cement 16 (in cased wells) and into formation 12. These perforations 18a when frac packed are designed to create new flow paths for hydrocarbons to migrate from the formation 12 into screen interior 32. The spacing, number, size and depth of these new perforations 18a are selected to maximize production.

After the perforation step is completed, conventional hydraulic fracturing steps are performed to form new fractures 19a. As illustrated by the arrows in FIG. 4, particulate material in a liquid slurry form is forced, under pressure, from the interior 32 of the screen 21 and out through perforations 18a where it is deposited in fractures 19a in the formation 12. The fractures 19a are filled with natural or synthetic particulate materials 50, known as proppants, which form porous flow paths connected to the previous gravel pack. According to the present invention particulate material not only fills the fractures and the perforation paths, it also is deposited into the interior 32 of screen 21. Preferably, some or all of the proppant (particulates) pumped into the well in the fracturing process are mixed with a consolidating material that causes the particles to bond, stick, be attracted or mass together. Preferably, at least the "tail-end" portion, that is, the portion of particulates deposited in interior 32 and fractures adjacent the well have consolidating materials thereon. Consolidation reduces particle return to the well bore during flowback and the subsequent reworking steps. It is an advantage to have perforations and fractures connected with the existing gravel pack. Hence, filling both fracture area near the wellbore and perforations with proppant provides a flow path to the gravel pack.

A primary means for consolidation of the proppant or gravel pack and prevent flowback into the well is to employ resin-coated proppants. The particles used may constitute a resin-coated gravel which is either pre-coated or can be coated by an over flush of a chemical binding agent once the gravel is in place. It has also been known to add various hardenable binding agents or hardenable adhesives directly to an over flush of unconsolidated gravel in order to bind the particles together. Various other consolidation techniques are described in U.S. Pat. No. 5,492,178 (the entire disclosure of which is incorporated herein by reference). Thermoplastic material may be used which comprise any thermoplastic material capable of softening upon heating or softening at the temperature of the subterranean formation whereby it may adhere to the particulates with which it is introduced. Examples of suitable materials include polyolefins including polyethylene, polypropylene, polybutylene polymers and fluoropolymers and copolymers, polyimides, polyurethanes, polysulfones, polycarbonates and cellulose derivatives.

U.S. Pat. Nos. 5,775,425, 5,501,274, 5,582,279 and 5,532,249 (the entire disclosures of which are incorporated herein by reference) disclose using tackifiers on particulates to cause consolidation. The tackifying compound comprises a liquid or a solution of a compound capable of forming at least a partial coating upon the substrate material with which it is admixed prior to or subsequent to placement in the subterranean formation. In some instances, the tackifying compound may be a solid at ambient surface conditions and upon initial admixing with the particulate and after heating upon entry into the wellbore for introduction into the subterranean formation become a melted liquid which at least partially coats a portion of the particulate.

U.S. Pat. Nos. 5,330,005, 5,439,055 and 5,501,275 (the entire disclosures of which are incorporated herein by reference) disclose consolidating proppants or gravel packs by the incorporation of a fibrous material in the fluid with which the particulates are introduced into the subterranean formation. The fibers generally have a length ranging upwardly from about 2 millimeters and a diameter of from about 6 to about 200 microns. Fibrillated fibers of smaller diameter also may be used. The fibers are believed to act to bridge across constrictions and orifices in the proppant pack and form a mat or framework which holds the particulates in place thereby limiting particulate flowback.

U.S. Pat. No. 5,551,514 (the entire disclosure of which is incorporated herein by reference) discloses a method for particulate consolidation that combines resin consolidation and placement of a fibrous material in intimate mixture with the particulates to enhance production without a gravel pack screen.

The gravel, particulate or proppant material may comprise substantially any substrate material that does not undesirably chemically interact with other components used in treating process. The material may comprise sand, ceramics, glass, sintered bauxite, resin coated sand, resin beads, metal beads, plastic beads, light weight beads and the like. Also, additional materials may be admixed with a particulate to reduce particulate flowback. The additional materials may comprise glass, ceramic, carbon composites, natural or synthetic polymers or metal and the like in the form of fibers, flakes, ribbons, beads, shavings, platelets and the like.

Figure 5:
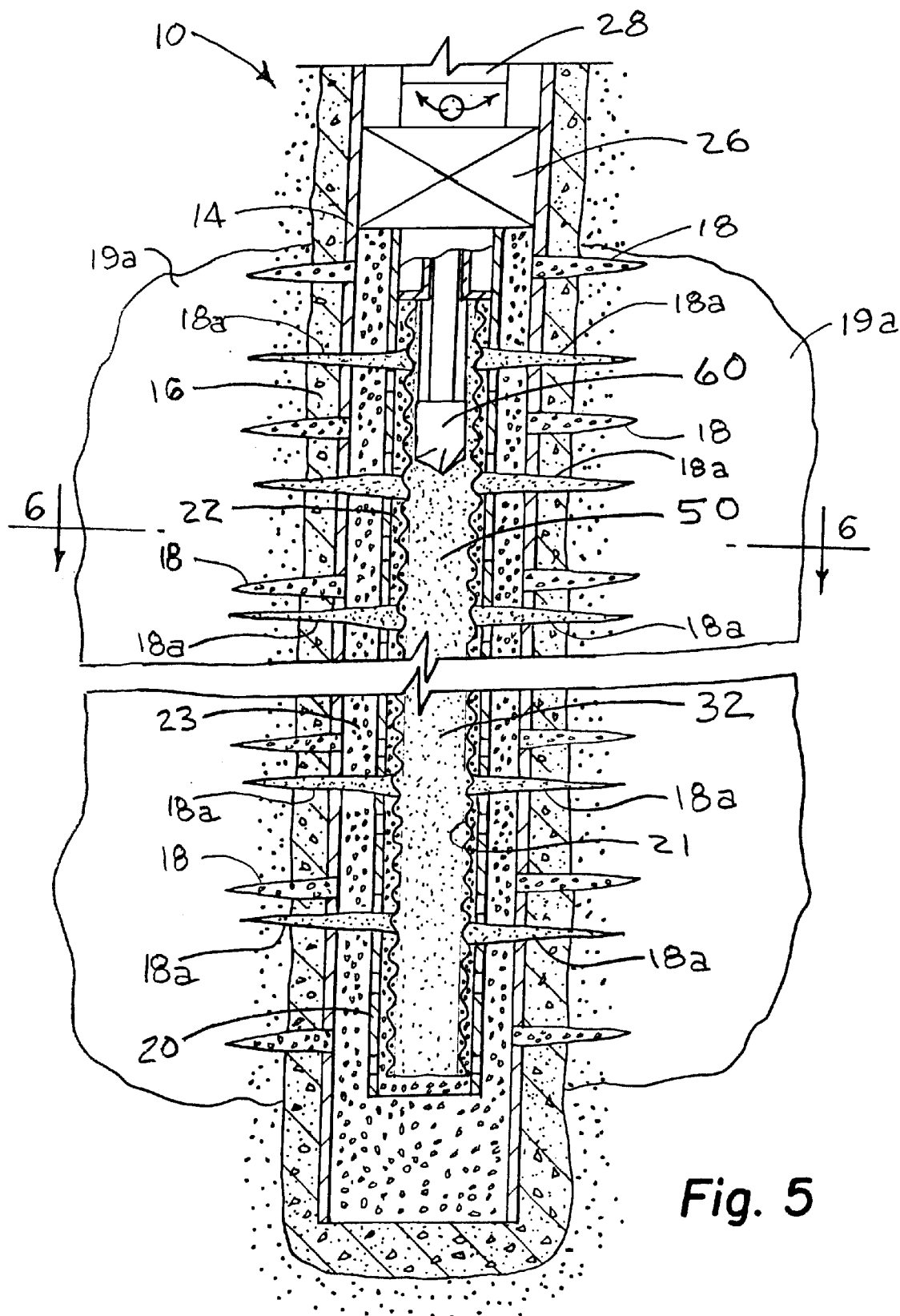
FIG. 5 is view similar to FIG. 1 showing removal of particulate from the wellbore.

No matter what materials are used in the frac packing process, it is desirable to clean the well and remove particulates from the wellbore inside 32 screen 21. If resin coated particulate 50 is used either mechanical or hydraulic drilling or the like can be used. In FIG. 5, a rotary mechanical or coil tubing powered drill or mill 60 is shown removing the material by the drilling process. Also, coiled tubing wash nozzle (not shown) could be used to remove the material 50 (especially if tacky rather than hardening solidification materials have been used).

Figure 6:
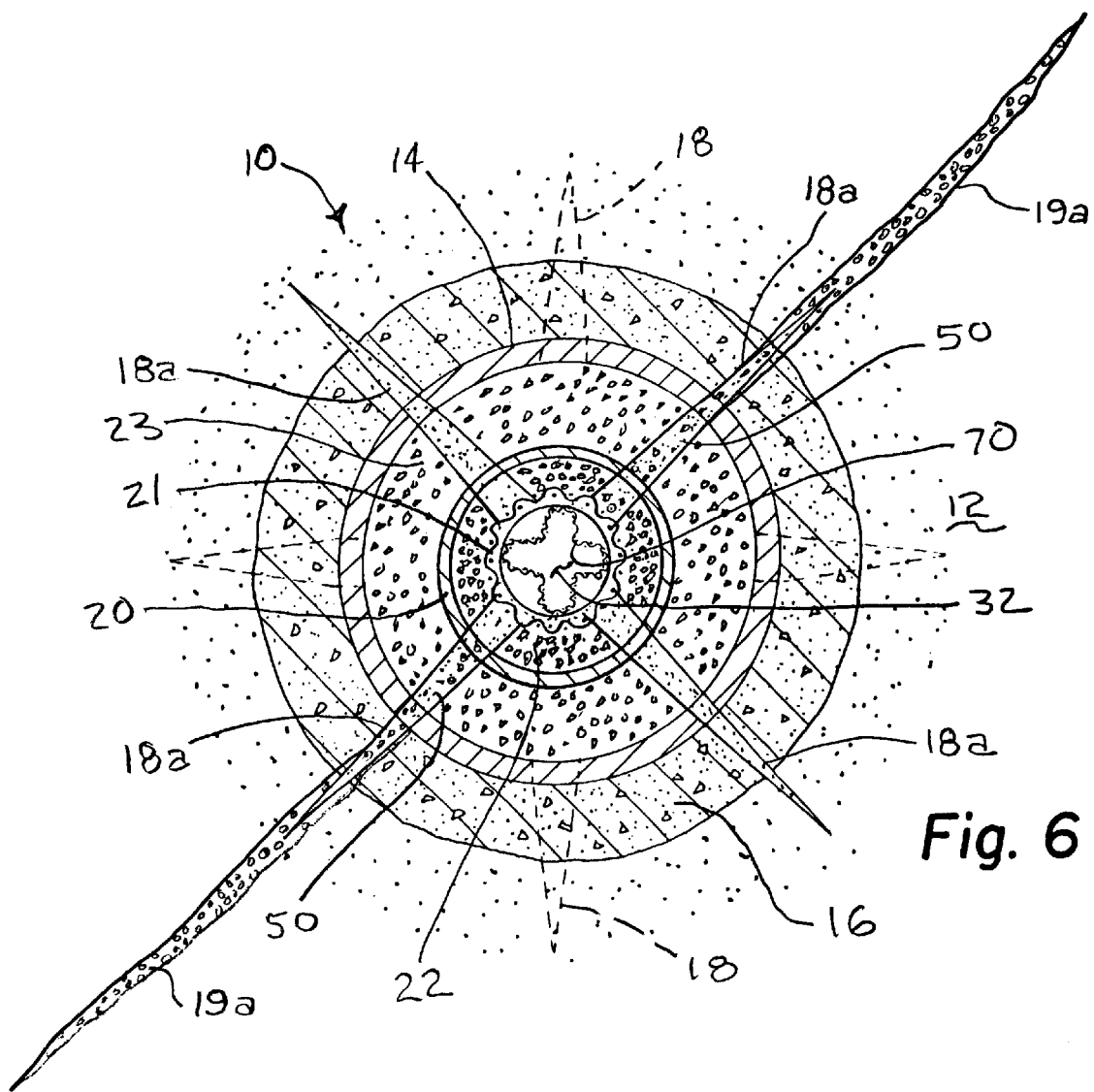
FIG. 6 is a cross-sectional view taken on line 6—6 of FIG. 5 looking in the direction of the arrows showing the step of inserting a second screen of the radially expandable type in the wellbore.
Figure 7:
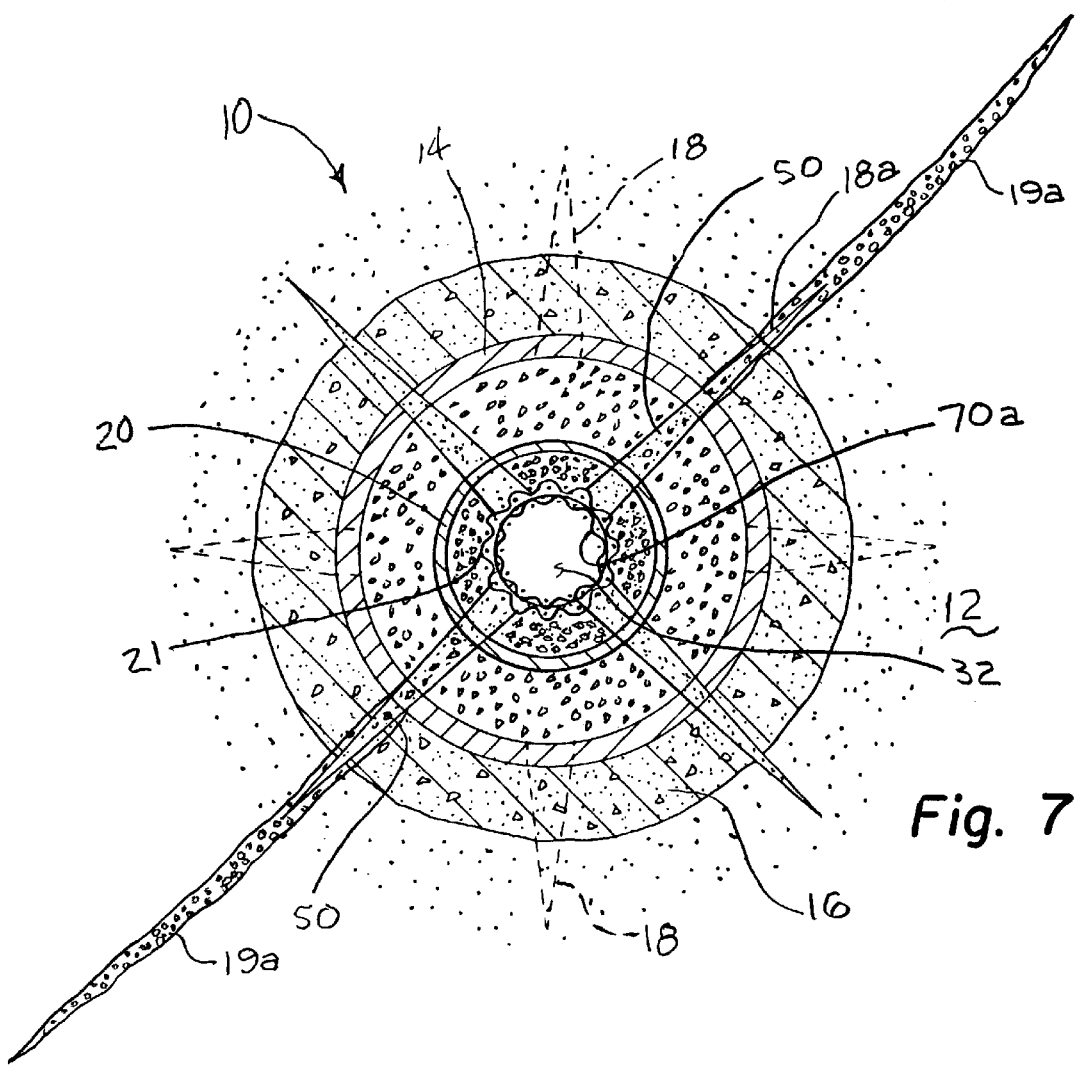
FIG. 7 is view similar to FIG. 6 showing the well with the screen radially expanded.

Following the step of cleaning step, a radially expandable screen assembly 70 is positioned inside the screen as shown in FIG. 6. Suitable radially expandable screens are available from ENVENTURE GLOBAL TECHNOLOGY LLC, Houston, Tex. under the product name POROFLEX™ or WEATHERFORD INTERNATIONAL, Houston, Tex. under the product name ESS™. These screens 70 can be radially expanded mechanically or hydraulically to the expanded shape 70a shown in FIG. 7. When properly expanded this second screen 70a locks in place against the interior of the original or first screen 21. During the second screen installation and expansion steps, the particulate or gravel is held in the perforations 18a by the consolidating material. Thereafter, hydrocarbons can be produced from a well through screen 70.

In FIGS. 8–11 the present inventions are utilized to complete a new well 110 horizontally extending into zone 112. Well 110 is cased 114 and cemented 116. The casing is unperforated and has a sand screen 121 installed therein forming an annulus 122 with the interior of the casing 114. Conventional crossover tool 125, packer 126 and production string 128 are connected to the screen and isolated the well in zone 112.

Figure 8:
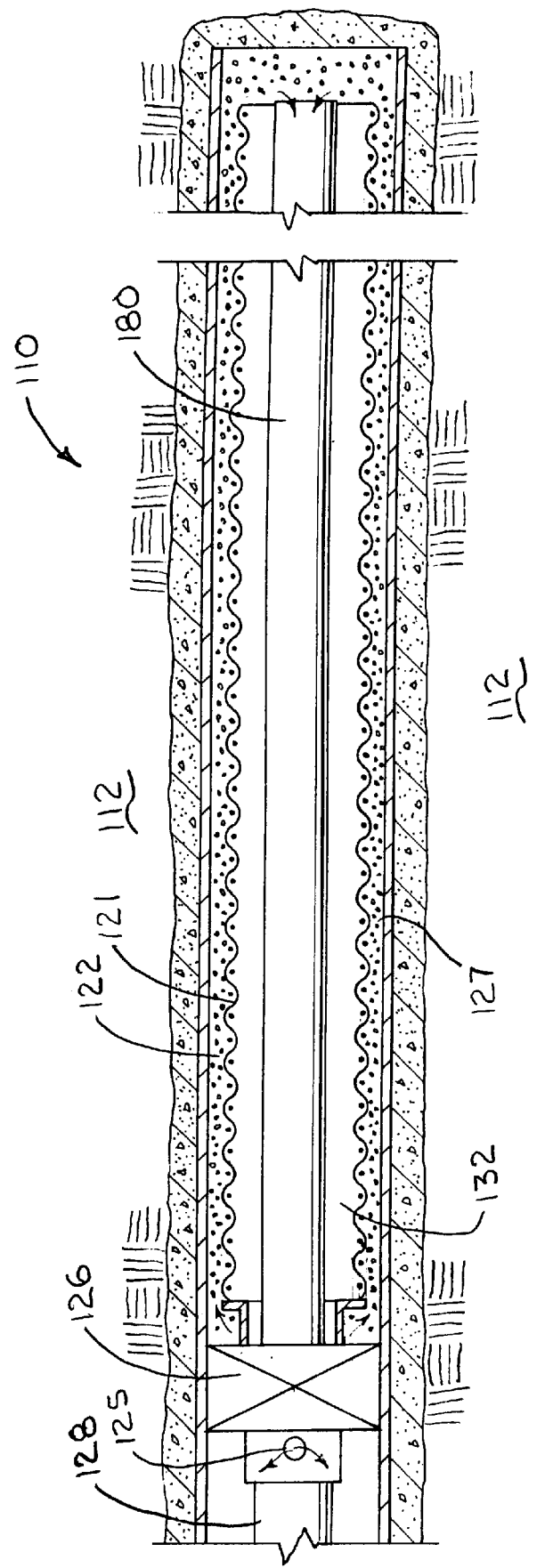
FIG. 8 is a longitudinal sectional view of a wellbore similar to FIG. 1 illustrating a horizontally extending unperforated cased wellbore with a first internal screen assembly illustrating the step of inserting particulate material in the wellbore between the casing and screen.

Gravel packing the annulus 122 is performed without perforating the casing 114. A wash pipe 180 can be used in the gravel packing process as shown in FIG. 8. According to a particular feature of the present invention a slurry containing particulate material 127 is pumped into the annulus 122 with the liquid returning from the well through the wash pipe 180. According to a particular feature of the present invention the gravel packing the annulus 122 is highly controllable even in a horizontally extending well because the sealed casing and wash tube prevent undesirable leak off through the screen or into the formation. In this manner a consistent gravel pack can be formed without resort to shunt tubes or other flow enhancing downhole structures. Alternatively, gravel packing can be installed in the casing before the casing is lowered into and cemented in place. The wash pipe 180 can either be removed or left in place.

Figure 9:
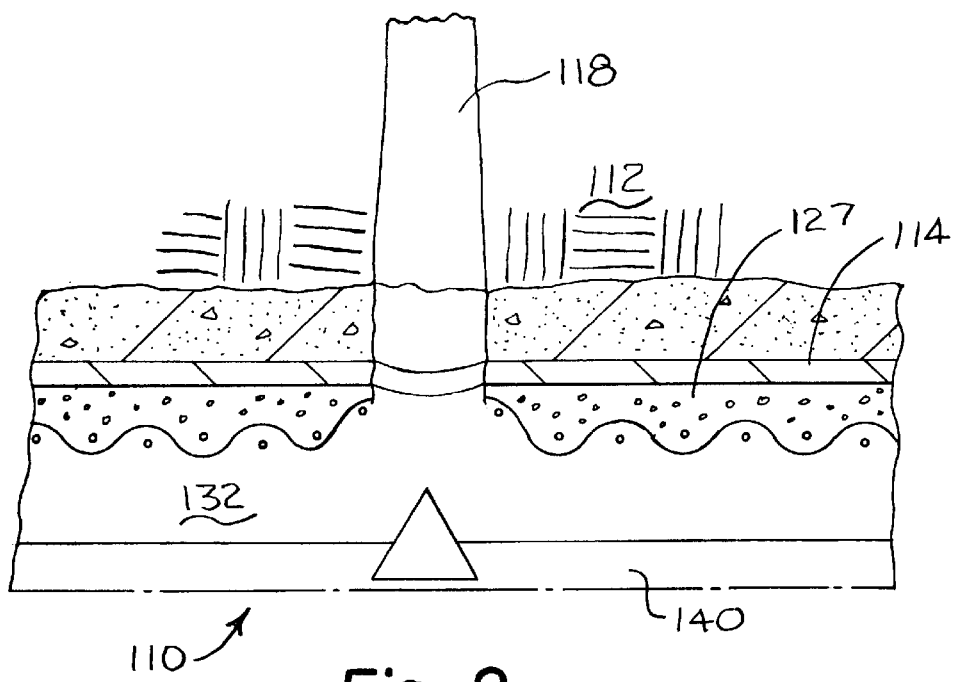
FIG. 9 is an enlarged cross-sectional view of the wellbore of FIG. 8 illustrating the step of perforating the well with the screen and particulate material in place in the casing.
Figure 10:
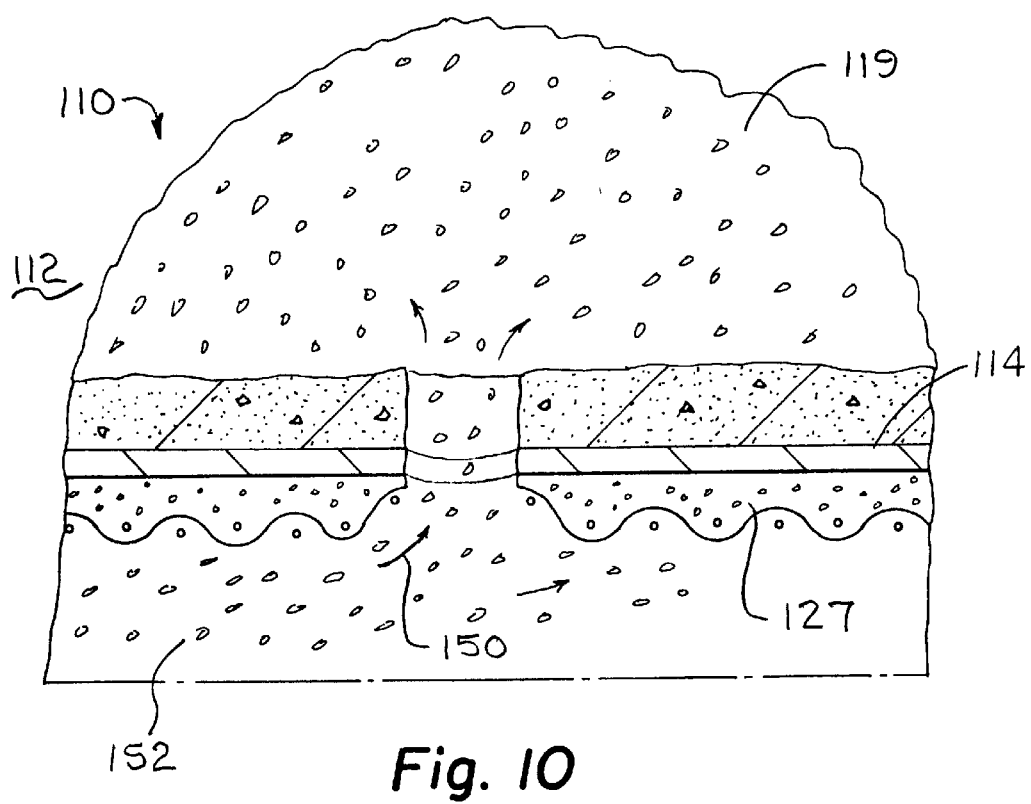
FIG. 10 is an enlarged cross-sectional view similar to FIG. 9 illustrating the step of creating fractures and inserting particulate material in the wellbore; formation fractures, and perforations.

After the gravel packing step the well is perforated and frac packed as was described in reference to FIGS. 1–7. FIG. 9 illustrates the perforating apparatus 140 in the interior 132 of screen 121 forming perforations 118 through screen 121 (and wash pipe 180 if present but not shown in this embodiment), annulus 122, and casing 114 and into formation 112. As shown in FIG. 10, apparatus 140 is moved and fractures 119 are formed and filled with particulate 150 in a frac packing step. After the frac packing step, particulate is removed from the interior 132. This frac packing and removal process was described in reference to the embodiment of FIGS. 1–7 and is incorporated in this embodiment by reference.

Figure 11:
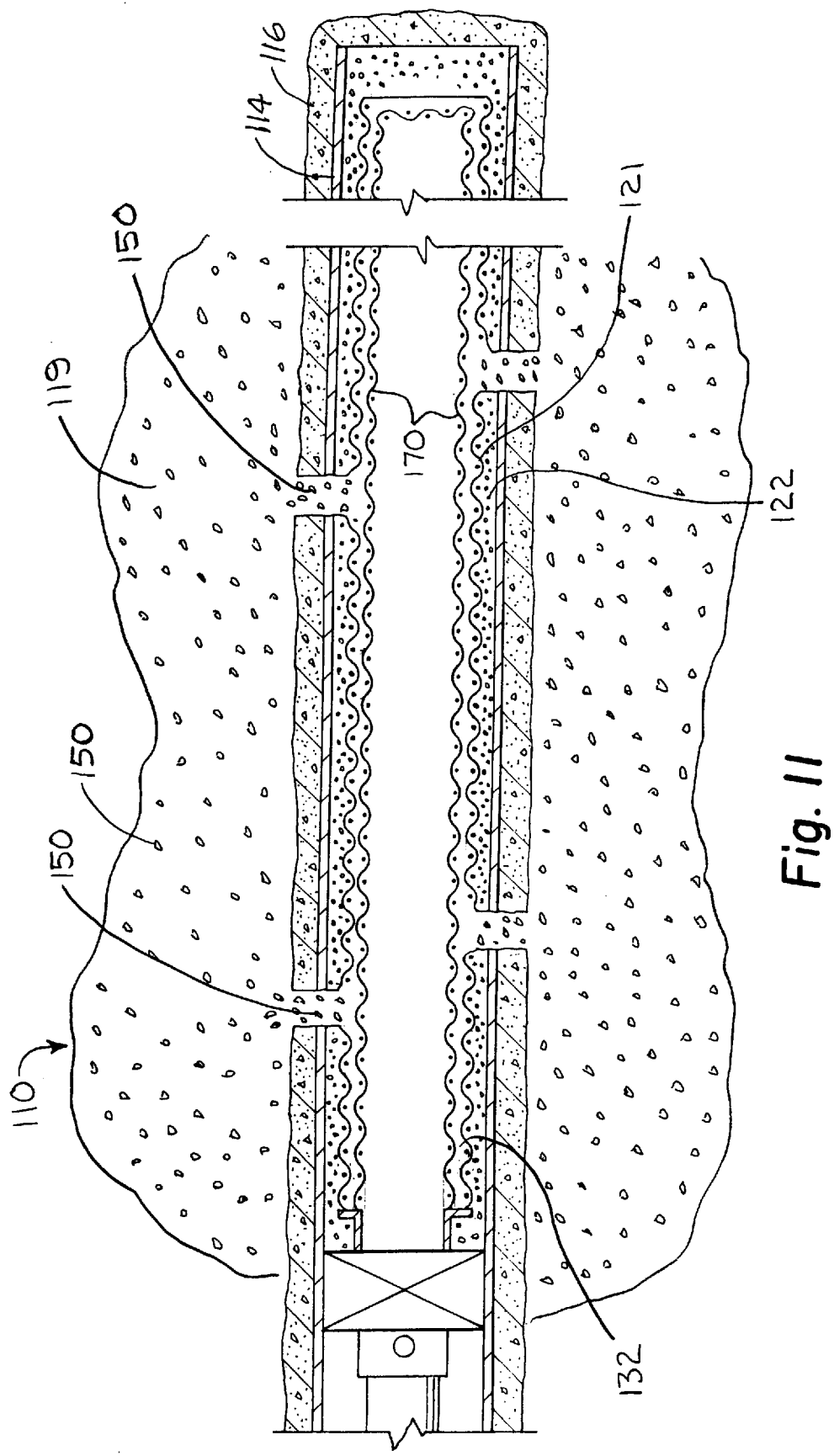
FIG. 11 is a longitudinal sectional view of a wellbore of FIG. 8 completed for production with a second screen located inside the first screen.

In FIG. 11 the well 110 is shown completed with a second sand screen 170 (preferably radially expandable) installed inside the first screen 121. Screen 170 is expanded to cover the perforations 118 in the first screen 121 to prevent particulates 150 from entering the well during hydrocarbon production. As shown the particulates in fracture 119, perforations 118 and annulus 122 are connected to allow flow from the formation 112 to enter the fracture flow through the particulates 150 to the gravel pack 122 and then through the two screens into the well bore.

The completion method shown and described in regard to FIGS. 8–11, (perforating and/or fracturing following gravel packing) completes a well with a uniform and controlled gravel pack. This method eliminates the problems associated with fluid losses to the formation during the gravel packing steps.

Figure 12:
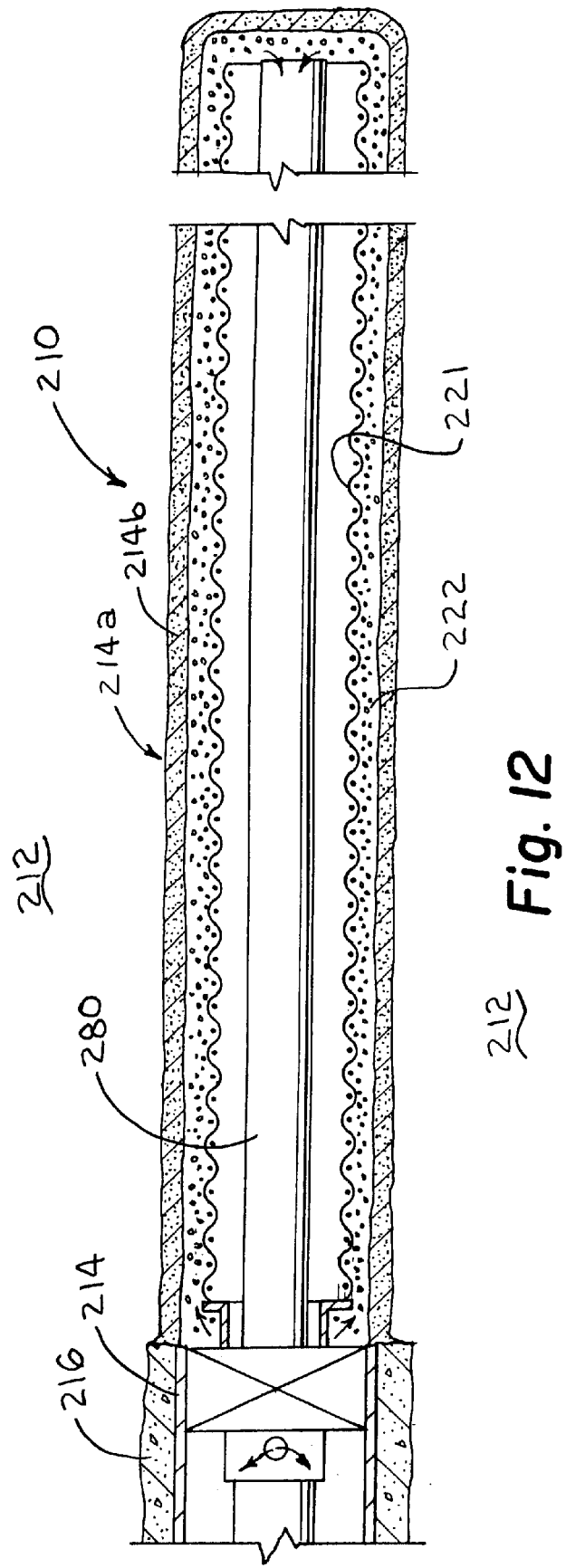
FIG. 12 is a longitudinal sectional view of a wellbore similar to FIG. 1 illustrating a horizontally extending open hole wellbore with a first internal screen assembly illustrating the step of inserting particulate material in the wellbore between the bore hole and screen.

In FIGS. 12–15, a completion method according to the present inventions will be described for an open hole completed wellbore 210. In FIG. 12 the unperforated wellbore 210 is illustrated extending horizontally into a hydrocarbon bearing formation or zone 212. Wellbore 210 has a cemented 216 casing 214 communicating at one end with an open hole well bore portion 214a. As is well known in the industry, during drilling into the formation special drilling mud or the like is used to seal off the portion 214b of the wellbore 210 extending into the zone 212. These materials may temporarily invade the formation and form a cake that reduces the permeability of the zone immediately around the well bore. After completion these materials can be dissolved or otherwise removed as is well known in the industry. Examples of materials and methods for use in forming and removing filter cakes in wells are discussed in U.S. Pat. Nos. 5,602,083; 5,783,527; 5,888,944 and 5,909,774, which are incorporated by reference herein for all purposes.

A sand screen assembly 221 is suspended in the open hole portion 214 and forms annulus 222. A crossover 225 and production packer 226 are located in the cased portion 214 and are connected to the screen 221. As illustrated in FIG. 12 a wash pipe 280 could be used during gravel packing. The borehole formation seal materials 214b and the wash pipe assist in creating a uniform and consistent gravel pack in the annulus 222 surrounding the screen 221. Problems with fluid leak off into the formation and through the screen are minimized by performing the gravel packing steps before performing production enhancement steps such as perforating, fracturing and removal of the borehole formation seal materials. After the annulus 222 is gravel packed the wash pipe 180 could either be removed.

Figure 13:
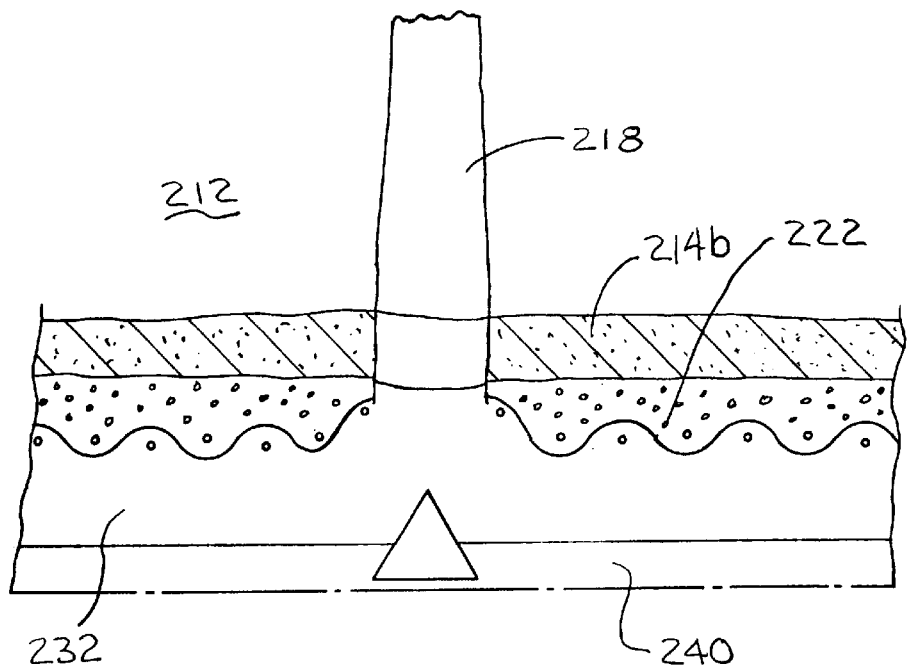
FIG. 13 is an enlarged cross-sectional view of the wellbore of FIG. 12 illustrating the step of perforating the well formation with the screen and particulate material in place in the wellbore.

In FIG. 13 the perforating step is performed after the annulus 222 is gravel packed. As illustrated in FIG. 13, the formation seal materials 214b remain in place, but it is to be understood that the seal materials could be removed after gravel packing. Perforator assembly 240 (illustrated as a perforating gun) is positioned in the interior 232 of sand screen 221 and discharged to form a plurality of perforations 218. Perforations 218 extend through the screen 221, gravel packed annulus 222 and into the formation 212.

Figure 14:
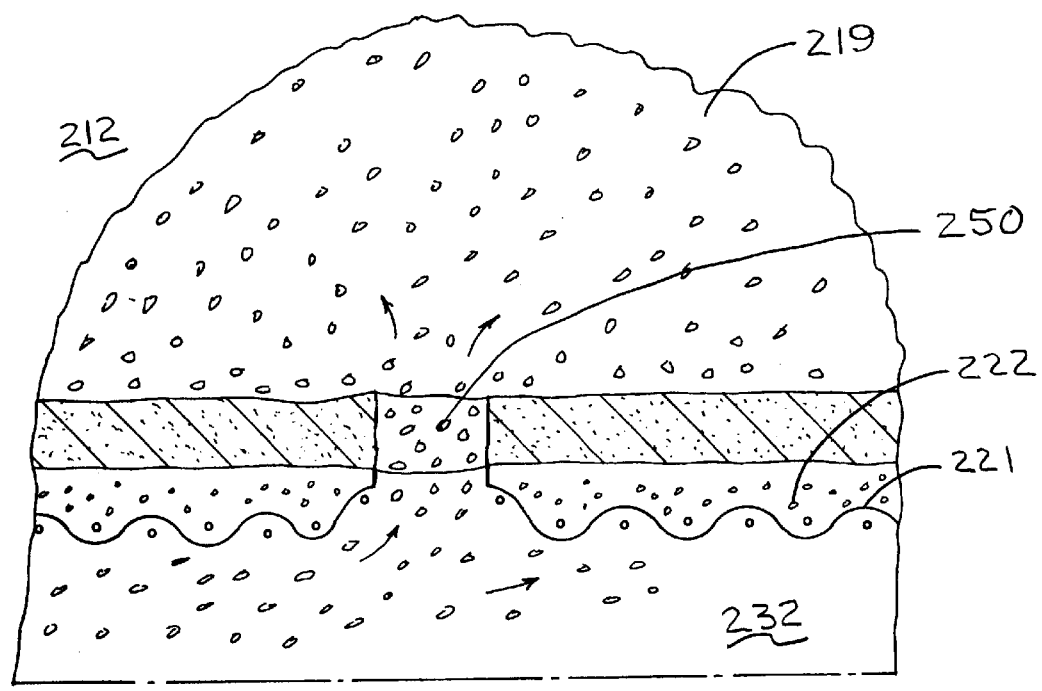
FIG. 14 is an enlarged cross-sectional view similar to FIG. 13 illustrating the step of creating fractures and inserting particulate material in the wellbore; formation fractures, and perforations.

The frac packing step is described in reference to FIG. 14. As previously described particulates in a slurry are pumped through perforations 218 and into the formation 212 to form particulate filled fractures 219. Particulates are also deposited in the perforations 218 and screen interior 232. As previously described the tail end portion of the particulates can be caused to consolidate for the reasons described. Following frac packing, particulate materials can be removed from the interior 232.

Figure 15:
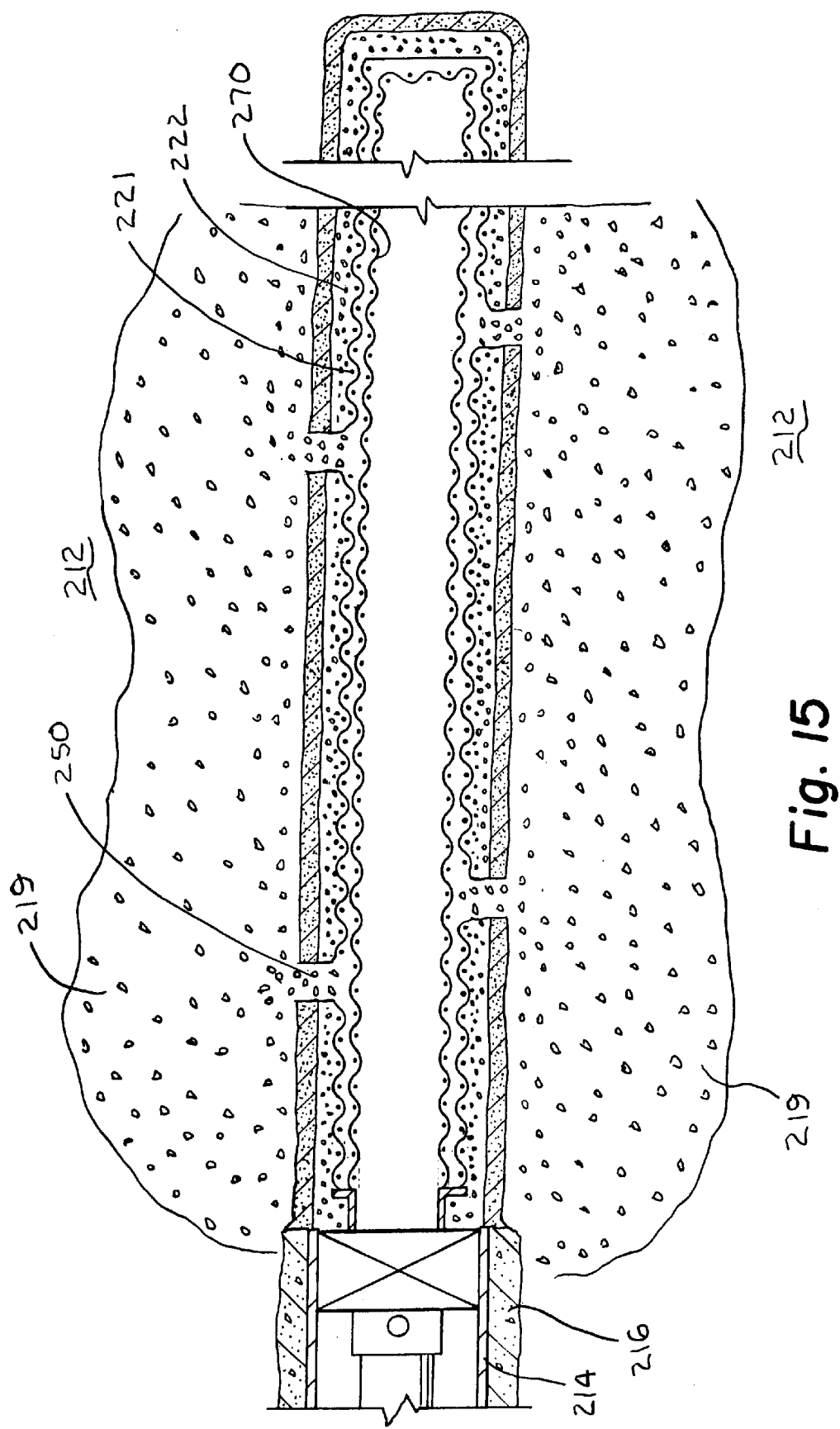
FIG. 15 is a longitudinal sectional view of a wellbore of FIG. 12 completed for production with a second screen located inside the first screen.

In FIG. 15 well bore 210 is illustrated completed and ready for production. After cleaning all or most of the particulates from the screen interior 232 a second sand screen is moved into the well. Preferably, the screen 270 is radially expandable and is moved into the well and expanded to contact and lock in place against the interior wall of the first sand screen 221. Screen 270 closes the perforations 218 formed in screen 212 during completion.

Even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used the attached claims.

The restrictive description and drawings of the specific examples above do not point out what an infringement of this patent would be, but are to provide at least one explanation of how to make and use the inventions. The limits of the inventions and the bounds of the patent protection are measured by and defined in the following claims.

What is claimed is:

1. A method of completing a well having a portion of the wellbore intersecting a hydrocarbon bearing formation, comprising the steps of:

installing a casing in the portion of the wellbore intersecting the formation;

gravel packing the casing in at least a part of the formation intersecting portion by placing gravel in the an annulus formed between a first screen and the interior of the casing; the first screen having an internal flow passageway;

thereafter, forming at least one opening extending from the internal passageway through the first screen and through the wall of the casing whereby the opening forms a fluid pathway between the internal passageway and the formation surrounding the casing;

thereafter, performing hydraulic fracturing of the formation by supplying liquid under pressure from the casing through the at least on opening an into the formation;

inserting particulate material into the formation by moving particulate material from the casing and through the at least one opening; and preventing particulate material from entering the wellbore through the at least one opening.

2. The method of claim 1 wherein the casing is cemented in place and the step of forming at least one opening additionally comprises forming and an opening extending through the cement.

3. The method of claim 1 wherein the step of forming at least one opening comprises the step of perforating from the internal passageway.

4. The method of claim 1 wherein the step inserting particulate into the formation additionally comprises consolidating at least a portion of the particulate materials.

5. The method of claim 1 wherein the step of preventing particulate material from reentering the wellbore through the at least one opening comprises moving a second screen into the interior passageway of the first screen and radially expanding the second screen into contact with the interior of the first screen to cover the opening in the first screen.

6. The method of claim 5 where in at least one of the screens comprises a perforated liner.

7. The method of claim 1 additionally comprising the step of removing hydrocarbons from the wellbore that enter the casing through the at least one opening.

8. The method of claim 1 wherein the step of forming at least one opening comprises moving perforating gun apparatus into the interior of the first screen and firing the perforating gun apparatus to form perforations extending into the formation.

9. The method of claim 1 wherein the step of preventing particulate from reentering the well comprises at least partially coating at least a portion of the particulate materials with curable resin.

10. The method of claim 1 wherein the step of preventing particulate from reentering the well comprises mixing fibrous material with at least a portion of the particulate material.

11. The method of claim 1 wherein the step of preventing particulate from reentering the well comprises at least partially combining part of the particulate with a tackifying compound.

12. The method of claim 1 additionally comprises the step of removing particulate materials from the internal passageway of the first screen.

13. The method of claim 1 additionally comprises the step of drilling particulate materials from the internal passageway of the first screen.

14. The method of claim 1 wherein the fracturing and inserting particulate material steps compromise forming at least one fracture connected with perforations and filling the fracture and perforations with particulate materials.

15. The method of claim 1 wherein the particulate material is selected from the group consisting of sand, gravel, glass, bauxite, polymer, metal and ceramic materials.

16. The method of claim 1 wherein the particulate material is of a size to inhibit fines from flowing through the gravel pack and into the wellbore.

17. The method of claim 1 wherein the well has multiple spaced intersections with one or more hydrocarbon bearing formations and wherein the method additionally comprises the step of isolating and individually completing at least one of the hydrocarbon bearing formations.

18. The method of claim 1 additionally comprising the step of isolating and completing the portion of the well intersecting the formation.

19. The method of claim 1 wherein the screen are porous to hydrocarbons but not to the particulate materials.

20. The method of claim 1 wherein the step of preventing particulate material from entering the wellbore comprises installing a particulate material control apparatus in the interior passageway.

21. The method of claim 1 additionally comprising the step of installing a wash pipe in the internal flow passageway and thereafter placing particulate material in the first screen annulus.

22. A method of gravel packing a well having a portion of the wellbore intersecting a hydrocarbon bearing formation, comprising the steps of:

installing a casing well wherein the casing has an unperforated wall in the portion of the wellbore intersecting the formation;

installing a first screen in the portion of the casing intersecting the formation to form an annulus with the interior of the casing wall, the first screen having an internal flow passageway;

pumping a slurry of particulate material and fluid into well through the casing and into the annulus while the unperforated casing prevents fluid loss from the slurry into the formation, depositing particulate material in the annulus by removing slurry fluid from the well through the internal flow passageway;

thereafter, forming at least one opening extending from the internal passageway through the first screen and through the wall of the casing whereby the opening forms a flow pathway between the internal passageway the formation surrounding the casing;

thereafter, performing hydraulic fracturing of the formation by supplying liquid under pressure from the casing through the at least one opening and into the formation;

inserting particulate material into the formation by moving particulate material from the casing and through the at least one opening; and preventing particulate material from entering the wellbore through the at least one opening.

23. The method of claim 22 wherein the casing is cemented in place and the step of forming at least one opening additionally comprises forming and opening extending through the cement.

24. The method of claim 22 wherein the step of forming at least one opening comprises the step of perforating from the internal passageway.

25. The method of claim 22 wherein the step inserting particulate into the formation additionally comprises consolidating at least a portion of the particulate materials.

26. The method of claim 22 wherein the step of preventing particulate material from reentering the wellbore through the at least one opening comprises moving a second screen into the interior passageway of the first screen and radially expanding the second screen into contact with the interior of the first screen to cover the opening in the first screen.

27. The method of claim 26 wherein at least one of the screens comprises a perforated liner.

28. The method of claim 22 additionally comprising the step of removing hydrocarbons from the wellbore that enter the casing through the at least one opening.

29. The method of claim 22 wherein the step of forming at least one opening comprises moving perforating gun apparatus into the interior of the first screen and firing the perforating gun apparatus to form perforations extending into the formation.

30. The method of claim 22 wherein the step of preventing particulate from reentering the well comprises at least partially coating at least a portion of the particulate materials with curable resin.

31. The method of claim 22 wherein the step of preventing particulate from reentering the well comprises mixing fibrous material with at least a portion of the particulate material.

32. The method of claim 22 wherein the step of preventing particulate from reentering the well comprises at least partially combining part of the particulate with a tackifying compound.

33. The method of claim 22 additionally comprises the step of removing particulate materials from the internal passageway of the first screen.

34. The method of claim 22 additionally comprises the step of drilling particulate materials from the internal passageway of the first screen.

35. The method of claim 22 wherein the fracturing and inserting particulate material steps compromise forming at least one fracture connected with perforations and filling the fracture and perforations with particulate materials.

36. The method of claim 22 wherein the particulate material is selected from the group consisting of sand, gravel, glass, bauxite, metal, polymer and ceramic materials.

37. The method of claim 22 wherein the particulate material is of a size to inhibit fines from flowing through the gravel pack and into the wellbore.

38. The method of claim 22 wherein the well has multiple spaced intersections with one or more hydrocarbon bearing formations and wherein the method additionally comprises the step of isolating and individually completing at least one of the hydrocarbon bearing formations.

39. The method of claim 22 additionally comprising the step of isolating and completing the portion of the well intersecting the formation.

40. The method of claim 22 wherein the screen are porous to hydrocarbons but not to the particulate materials.

41. The method of claim 22 wherein the step of preventing particulate material from entering the wellbore comprises installing a particulate material control apparatus in the interior passageway.

42. The method of claim 22 additionally comprising the step of installing a wash pipe in the internal flow passageway and thereafter placing particulate material in the first screen annulus.

43. A method of servicing a well having a portion of the wellbore intersecting a subterranean hydrocarbon bearing formation, a first screen located in the formation intersecting portion of the wellbore and particulate material in the annulus formed between the screen and the wellbore, the first screen having an internal passageway, the method comprising:
   forming at least one opening in the first screen;
   inserting particulate material into the formation by moving particulate material from the wellbore and through the at least one screen opening; and
   preventing particulate material from entering the wellbore through the at least one opening.

44. The method of claim 43 wherein portion of the wellbore intersecting the formation is cased and the step of forming at least one opening additionally comprised forming an opening extending through the casing.

45. The method of claim 43 wherein portion of the wellbore intersecting the formation is uncased.

46. The method of claim 43 wherein the portion of the wellbore intersecting the formation is cased and the casing is cemented in place and the step of forming at least one opening additionally comprised forming an opening extending through the casing and cement.

47. The method of claim 43 wherein the step of forming at least one opening comprises the step of perforating from the internal passageway.

48. The method of claim 43 wherein the step of forming at least one opening comprises the step of perforating from the internal passageway.

49. The method of claim 43 wherein the step inserting particulate into the formation additionally comprises consolidating at least a portion of the particulate materials.

50. The method of claim 43 wherein the step of preventing particulate material from reentering the wellbore through the at least one opening comprises moving a second screen into the interior passageway of the first screen and radially expanding the second screen into contact with the interior of the first screen to cover the opening in the first screen.

51. The method of claim 50 where in at least one of the screens comprises a perforated liner.

52. The method of claim 43 additionally comprising the step of removing hydrocarbons from the wellbore that enter the casing through the at least one opening.

53. The method of claim 43 wherein the step of forming at least one opening comprises moving perforating gun apparatus into the interior of the first screen and firing the perforating gun apparatus to form perforations extending into the formation.

54. The method of claim 43 wherein the step of preventing particulate from reentering the well comprises at least partially coating at least a portion of the particulate materials with curable resin.

55. The method of claim 43 wherein the step of preventing particulate from reentering the well comprises mixing fibrous material with at least a portion of the particulate material.

56. The method of claim 43 wherein the step of preventing particulate from reentering the well comprises at least partially combining part of the particulate with a tackifying compound.

57. The method of claim 43 additionally comprises the step of removing particulate materials from the internal passageway of the first screen.

58. The method of claim 43 additionally comprises the step of drilling particulate materials from the internal passageway of the first screen.

59. The method of claim 43 wherein the fracturing and inserting particulate material steps compromise forming at least one fracture connected with perforations and filling the fracture and perforations with particulate materials.

60. The method of claim 43 wherein the particulate material is selected from the group consisting of sand, gravel, glass, metal, polymer, bauxite and ceramic materials.

61. The method of claim 43 wherein the particulate material is of a size to inhibit fines from flowing through the gravel pack and into the wellbore.

62. The method of claim 43 wherein the well has multiple spaced intersections with one or more hydrocarbon bearing formations and wherein the method additionally comprises the step of isolating and individually completing at least one of the hydrocarbon bearing formations.

63. The method of claim 43 additionally comprising the step of isolating and completing the portion of the well intersecting the formation.

64. The method of claim 43 wherein the screen are porous to hydrocarbons but not to the particulate materials.

65. The method of claim 43 wherein the step of preventing particulate material from entering the wellbore comprises installing a particulate material control apparatus in the interior passageway.

66. The method of claim 43 additionally comprising the step of installing a wash pipe in the internal flow passageway and thereafter placing particulate material in the first screen annulus.

67. A method of gravel packing a well having an open hole portion of the wellbore intersecting a hydrocarbon bearing formation, comprising the steps of:
   reducing the porosity the wellbore wall in the portion of the wellbore intersecting the formation by inserting materials into the formation material around the wellbore;
   installing a first screen in the open hole portion of the wellbore intersecting the formation to form an annulus with the interior of the wellbore wall, the first screen having an internal flow passageway;

pumping a slurry of particulate material and fluid into well through the wellbore and into the annulus while the reduced porosity wall prevents fluid loss from the slurry into the formation, depositing particulate material in the annulus by removing slurry fluid from the well through the internal flow passageway;

thereafter, forming at least one opening extending from the internal passageway through the first screen and through the wall of the borehole whereby the opening forms a flow pathway between the internal passageway the formation surrounding the wellbore;

thereafter, performing hydraulic fracturing of the formation by supplying liquid under pressure from the borehole through the at least on opening an into the formation;

inserting particulate material into the formation by moving particulate material from the borehole and through the at least one opening; and preventing particulate material from entering the wellbore through the at least one opening.

68. The method of claim 67 wherein the step of reducing the porosity of the formation material forming the wellbore comprises inserting materials into the formation in the wellbore wall.

69. The method of claim 67 wherein the step of reducing the porosity of the formation material forming the wellbore comprises inserting materials into the formation in the wellbore wall to form a mud cake.

70. The method of claim 67 additionally comprising the step of removing the porosity reducing materials from the formation after the step of inserting particulate materials in the annulus.

71. The method of claim 67 wherein at least a portion of the borehole is cased and cemented in place.

72. The method of claim 67 wherein the step of forming at least one opening comprises the step of perforating from the internal passageway.

73. The method of claim 67 wherein the step inserting particulate into the formation additionally comprises consolidating at least a portion of the particulate materials.

74. The method of claim 67 wherein the step of preventing particulate material from reentering the wellbore through the at least one opening comprises moving a second screen into the interior passageway of the first screen and radially expanding the second screen into contact with the interior of the first screen to cover the opening in the first screen.

75. The method of claim 74 wherein at least one of the screens comprises a perforated liner.

76. The method of claim 67 additionally comprising the step of removing hydrocarbons from the wellbore that enter the borehole through the at least one opening.

77. The method of claim 67 wherein the step of forming at least one opening comprises moving perforating gun apparatus into the interior of the first screen and firing the perforating gun apparatus to form perforations extending into the formation.

78. The method of claim 67 wherein the step of preventing particulate from reentering the well comprises at least partially coating at least a portion of the particulate materials with curable resin.

79. The method of claim 67 wherein the step of preventing particulate from reentering the well comprises mixing fibrous material with at least a portion of the particulate material.

80. The method of claim 67 wherein the step of preventing particulate from reentering the well comprises at least partially combining part of the particulate with a tackifying compound.

81. The method of claim 67 additionally comprises the step of removing particulate materials from the internal passageway of the first screen.

82. The method of claim 67 additionally comprises the step of drilling particulate materials from the internal passageway of the first screen.

83. The method of claim 67 wherein the fracturing and inserting particulate material steps compromise forming at least one fracture connected with perforations and filling the fracture and perforations with particulate materials.

84. The method of claim 67 wherein the particulate material is selected from the group consisting of sand, gravel, glass, bauxite, polymer, metal and ceramic materials.

85. The method of claim 67 wherein the particulate material is of a size to inhibit fines from flowing through the gravel pack and into the wellbore.

86. The method of claim 67 wherein the well has multiple spaced intersections with one or more hydrocarbon bearing formations and wherein the method additionally comprises the step of isolating and individually completing at least one of the hydrocarbon bearing formations.

87. The method of claim 67 additionally comprising the step of isolating and completing the portion of the well intersecting the formation.

88. The method of claim 67 wherein the screen are porous to hydrocarbons but not to the particulate materials.

89. The method of claim 67 wherein the step of preventing particulate material from entering the wellbore comprises installing a particulate material control apparatus in the interior passageway.

90. The method of claim 67 additionally comprising the step of installing a wash pipe in the internal flow passageway and thereafter placing particulate material in the first screen annulus.

* * * * *